United States Patent [19]

Radtke

[11] 4,350,215
[45] Sep. 21, 1982

[54] DRILL BIT AND METHOD OF MANUFACTURE

[75] Inventor: Robert P. Radtke, Kingwood, Tex.

[73] Assignee: NL Industries Inc., New York, N.Y.

[21] Appl. No.: 189,370

[22] Filed: Sep. 22, 1980

Related U.S. Application Data

[63] Continuation of Ser. No. 943,313, Sep. 18, 1978, abandoned.

[51] Int. Cl.³ .............................................. E21B 10/58
[52] U.S. Cl. ..................... 175/329; 175/410; 76/108 A; 228/122
[58] Field of Search .............. 175/329, 330, 374, 410; 76/101 R, 101 E, 108 R, 108 A, DIG. 11, DIG. 12; 51/295, 305; 403/266; 29/525; 228/122, 134, 135

[56] References Cited

U.S. PATENT DOCUMENTS

| | | | |
|---|---|---|---|
| 2,027,787 | 1/1936 | Ridgway et al. | 76/107 A |
| 2,578,351 | 12/1951 | Griffiths | 76/108 R |
| 2,597,771 | 5/1952 | Bergstrom | 175/410 |
| 3,600,795 | 8/1971 | Brundin | 228/122 |
| 4,006,788 | 2/1977 | Garner | 175/330 |
| 4,073,354 | 2/1978 | Rowley et al. | 175/329 |
| 4,098,362 | 7/1978 | Bonnice | 175/329 |
| 4,128,136 | 12/1978 | Generoux | 175/330 |
| 4,148,368 | 4/1979 | Evans | 175/329 |
| 4,156,329 | 5/1979 | Daniels et al. | 175/330 X |
| 4,200,159 | 4/1980 | Peschel | 175/329 |

*Primary Examiner*—Ernest R. Purser

[57] ABSTRACT

A drag drill bit includes a plurality of cutter assemblies comprising synthetic polycrystalline diamonds which are held by brazing material within dimensionally controlled pockets formed in the drill bit matrix. The method of manufacturing the bit includes forming the drill bit head by powder metallurgy with a plurality of dimensionally controlled pockets, placing brazing material in communication with each pocket, locating and fixturing a cutter assembly within each pocket by force-fit and brazing the cutter assemblies to the bit head by a furnace cycle.

19 Claims, 9 Drawing Figures

DRILL BIT AND METHOD OF MANUFACTURE

This is a continuation of application, Ser. No. 943,313, filed Sept. 18, 1978 and now abandoned.

BACKGROUND OF THE INVENTION

1. Field of the Invention

The invention relates to drill bits and methods of manufacturing drill bits, and is particularly applicable to drag type drill bits. More specifically, the present invention relates to drill bits formed by powder metallurgy wherein the cutter assemblies are brazed into pockets formed in the bit matrix.

2. Description of the Prior Art

The use of drag type drill bits in the drilling of wells, particularly oil and gas wells, is well known. The typical drag type drill bit serves to transfer the weight of the drill string to the bottom of the borehole. The protruding cutters on the bottom surface of the drill bit serve to cut into the formation as the drill bit rotates. In extremely hard formations, the cutters essentially crush or fracture the formation by means of the large compressive force applied to the formation. In such hard formations, the cutters may take the form of relatively small diamonds, e.g., 1/10 carat. In soft formations, the drag type drill bit essentially plows through the formation. The typical drill bit used in relatively soft formations may utilize large cutters, e.g., 2 karat.

Numerous considerations must be taken into account in the design of a drag type bit. As mentioned above, the cutter size is typically dictated by the hardness of the formation. Furthermore, the cutter may be chosen to have a specific profile, e.g., round or V-shaped. The concentration and placement of the diamonds along the face of the drill bit are critical to drill performance.

Careful attention must be given to the hydraulic characteristics of the bit since the drill bit must remain relatively cool and the cuttings must be promptly swept away from the drilling interface so that they are not reground. To this end, intricately designed waterways or fluid courses are provided on the face of the drill bit to direct the drilling mud across the cutting face to effect cooling and cleaning. Typical hydraulic designs provide for either radial flow or circumferential flow, or some combination thereof. The hydraulics of the bit are also affected by the "profile" of the bit, i.e., the radius of curvature at the face of the bit. Nozzles may be used to develop desired hydraulic conditions.

Commercial drag type drill bits presently in use are typically formed by powder metallurgy techniques wherein a graphite mold is made to the shape of the bit. Depressions are carefully located in the mold and natural diamond cutters are glued into place in the depressions. A tungsten carbide powder is placed into the mold and infiltrated in a furnace cycle with a copper alloy with a steel shank in place. The maximum temperature in the furnace cycle may be on the order of 2200° F. The bit is allowed to drop out of the mold and is finished by welding to the steel shank an extension including the pin, and final machining.

Recent developments in the manufacture of drag type drill bits suggest that synthetic polycrystalline diamond drill blanks may be utilized as the cutters in such bits. These synthetic cutters have the unique advantage of being uniformly shaped, as opposed to the varying shapes of natural diamonds. However, present synthetic diamond drill blanks cannot be placed in the matrix prior to furnacing as can natural diamonds because the synthetic diamond cannot withstand temperatures on the order of 2200° F. Synthetic polycrystalline diamonds in a disc form have been brazed directly onto the matrix of drag drill bits for use in soft formations. To date, the synthetic diamond discs which have been secured to drag type drill bits have been relatively large, e.g., ½ inch in diameter, because of limitations in the reliable attachment of the cutter to the drill bit matrix. Because the cutters are not located in a single plane, some form of positive fixturing must be used when attaching the cutters to the previously formed and furnaced drill bit head. It has been proposed to use dead weights and various camming arrangements to fixture synthetic diamond cutters during brazing operations. However, such fixturing techniques have proven extremely complex and unreliable. It also has been suggested to fixture the synthetic diamond cutters by the use of shims of a high expanding metal that expands during the heating of the brazing operation and is removable upon cooling. This approach has also proved disadvantageous.

Thus, it can be seen that there is an acute need for a drill bit having securely attached cutters, for example, synthetic polycrystalline diamond cutters, attached after furnacing of the bit head matrix. Improved attachment methods make possible the use of relatively small cutters for use in medium and hard formations.

SUMMARY OF THE INVENTION

According to the present invention there is provided a novel drill bit including a plurality of cutter assemblies preferably comprising synthetic polycrystalline diamonds which are held by brazing material within dimensionally controlled pockets formed in the drill bit matrix. Specifically, the instant invention provides a drag type drill bit having a drill bit head formed by powder metallurgy to include a plurality of pockets adapted to receive cutter assemblies by a force fit preparatory to brazing the cutter assemblies to the pockets. The drill bit includes:

(a) a drill bit head having a plurality of dimensionally controlled pockets formed therein;

(b) a cutter assembly for each pocket, each cutter assembly having a portion which is force fit into its respective pocket such that the cutter face extends outwardly above the drill bit head a preselected distance; and (c) brazing material between the pocket surfaces and the cutter portion to facilitate the attachment of the cutter assembly to the pocket walls.

The pockets formed in the drill bit head may include gas vents to allow the escape of gas formed in the brazing operation. According to a preferred embodiment, the cutter assemblies comprise drill blanks each including a synthetic polycrystalline diamond face and a backing face secured to the face. In a particular embodiment, the drill blank backing plate is secured to a support and the support is force fit into its respective pocket. According to this embodiment the support has a curved portion subtending an arc of greater than 180° so that the curved portion, acting in conjunction with its mating pocket portion, serves to locate and fixture the cutter assembly. The drill bit head is preferably formed by powder metallurgy with the pockets formed by protuberances on the mold; however, the bit head may be a solid metal body with machined pockets or a powder metal body with machined pockets.

According to the present invention there is also provided a novel method of manufacturing a drill bit comprising the steps of:

(a) forming a drill bit head with at least one dimensionally controlled pocket formed in the bit face, the pocket being free from internal negative relief and being formed to present the cutter face of an associated cutter assembly at a predetermined rake angle;

(b) providing a cutter assembly having a cutter face, the cutter assembly being adapted to being force fit into the pocket while maintaining a portion of the cutter face protruding above the drill bit head at the predetermined rake angle;

(c) placing a brazing material in communication with the pocket;

(d) locating the cutter assembly by force fitting a portion of the cutter assembly into the pocket; and (e) brazing the cutter assembly within the pocket by a furnace cycle having a maximum temperature below that which causes thermal damage to either the drill bit head or the cutter assembly.

According to this method the drill bit head may be formed by a powder metallurgy technique including the step of utilizing a graphite mold having a protuberance for forming the pocket, the protuberance having external dimensions slightly in excess of the inner dimensions of the finished pocket to allow for shrinkage during the furnacing of the drill bit head. In a preferred method the rake angle is formed in the range of 0° to −30°, with a preferred angle on the order of −20°. The brazing material may be in communication with the pocket by placing it inside of the pocket prior to force fitting the cutter assembly therein; however, the brazing material may also be placed in communication with the pocket by placing it outside of the pocket, e.g. by placing braze wire or braze powder over the pocket and allowing it to melt during the brazing operation so that it flows into the pocket by capillary action.

Accordingly, it is a principal feature of the present invention to provide a drill bit including a plurality of cutter assemblies, which may comprise synthetic polycrystalline diamonds, and securing the cutter assemblies by brazing material within dimensionally controlled pockets formed in the drill bit matrix so that the polycrystalline diamond cutter faces protrude a controlled distance above the drill bit matrix.

It is a further feature of the present invention to provide a drag type drill bit including cutter assemblies force fit into dimensionally controlled pockets in the drill bit head wherein each cutter assembly comprises a drill blank including a synthetic polycrystalline diamond face and a backing plate secured to the face and further includes a support secured to the backing face whereby the support is force fit into a pocket. One aspect of this feature is that the support may include a curved portion subtending an arc greater than 180° to permit self-fixturing by means of the engagement of the curved portion with its mating pocket portion.

It is still a further feature of the present invention to provide a method of manufacturing a drill bit wherein a drill bit head is formed with a plurality of dimensionally controlled pockets which receive cutter assemblies by force fit prior to securing the cutter assemblies by brazing. One aspect of this feature is that the cutter assemblies may be brazed within their respective pockets by a single furnace cycle having a maximum temperature below that which causes thermal damage to either the drill bit head or the cutter assembly.

Still further features and advantages of the present invention will become apparent from the following more detailed description thereof in connection with the following description of preferred embodiments.

DETAILED DESCRIPTION OF THE PREFERRED EMBODIMENT

Figure 1:
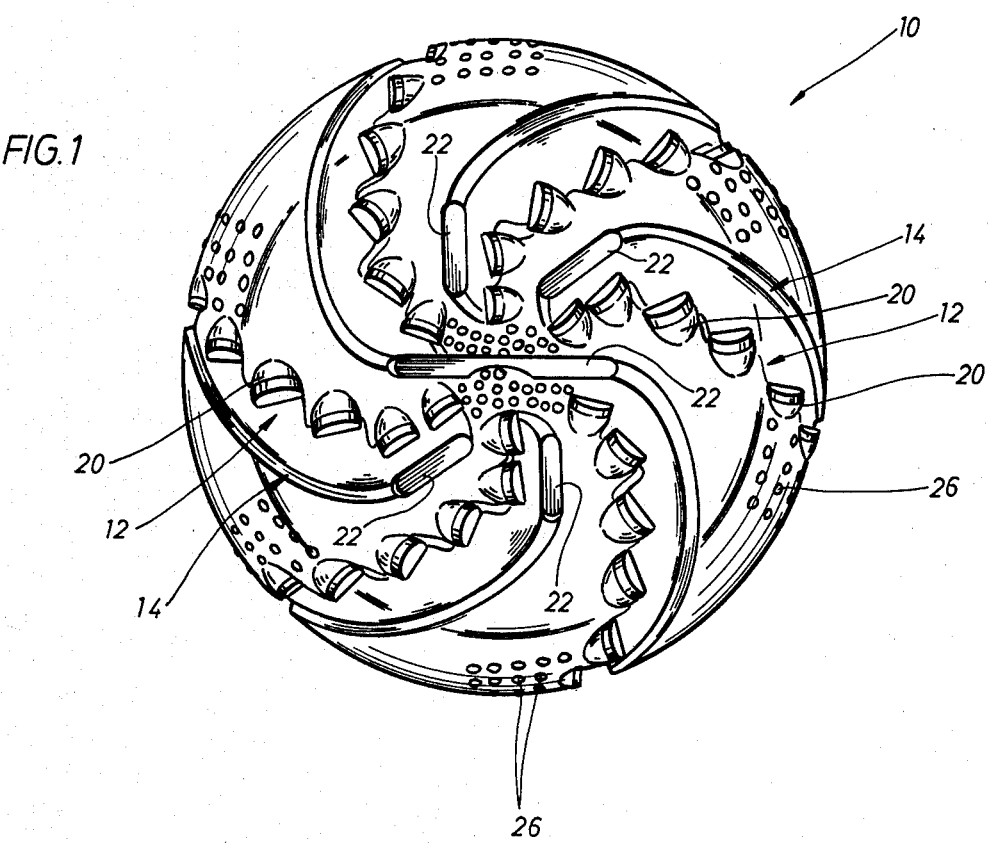
FIG. 1 is a bottom view of a drag type drill bit constructed in accordance with the present invention.
Figure 2:
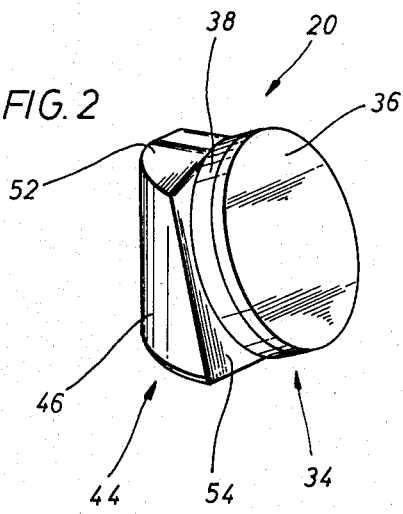
FIG. 2 is a perspective view of a cutter assembly utilized in the bit of FIG. 1.
Figure 3:
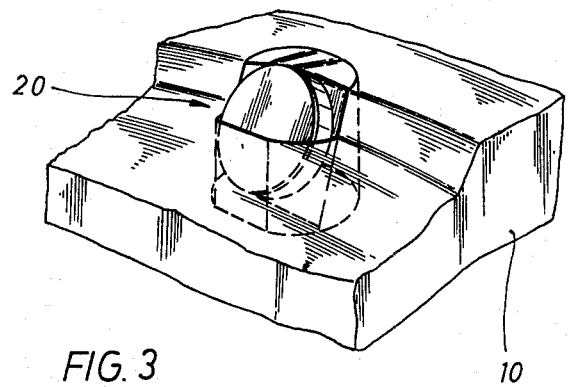
FIG. 3 is an enlarged, fragmented perspective view of the cutter assembly located within a pocket formed in the drill bit matrix.

The preferred embodiment of the present invention will now be described with reference to FIGS. 1-5. FIG. 1 is a bottom view of a drag type drill bit 10 constructed in accordance with the present invention. Bit 10 is a six-way drag bit with six curved or helical blades 12. Associated with each blade 12 is a waterway or fluid course 14 for directing the drilling mud emerging from the center of the drill bit along the face of the bit so as to cool the cutters and sweep away the cuttings. Each blade 12 includes six cutter assemblies 20 which are brazed into pockets in bit head 10 in accordance with the present invention. Bit 10 includes a plurality of centrally disposed openings 22 through which the drilling mud emerges for flow along fluid courses 14. Each fluid course 14 terminates at the periphery of the drill bit in a recessed area for transmission of the drilling mud and entrained cuttings back up the borehole in the manner well known in the art. The periphery of bit 10 also includes a plurality of recessed gauge diamonds 26 which are used to maintain the diameter of the borehole. The gauge diamonds are recessed into the matrix, as opposed to the face cutter assemblies 20 which have portions protruding from the matrix.

According to a preferred method of manufacturing a bit in accordance with the present invention, the bit head is formed by powder metallurgy techniques whereby a graphite mold is made to the shape of the bit. A plurality of flats are machined into the mold at positions corresponding to the pockets to be formed in the bit head. At each flat a protruding mold portion is secured to the graphite mold for forming the pocket. The protruding portion is shaped such that within the pocket there will be no negative relief. In accordance with known techniques, the mold is first filled with a tungsten carbide powder with the steel shank in place. The mold is then vibrated to compact the powder and a copper alloy binder is placed upon the powder. The filled mold is then furnaced so that the copper melts and infiltrates the powder. The protruding pocket-forming portion of the mold is sized so as to have external dimensions slightly in excess of the finished pocket to allow for shrinkage during the furnacing of the drill bit head.

A typical cutter assembly 20 associated with drill bit 10 will now be described with reference to FIGS. 2-5. Cutter assembly 20 includes a drill blank 34 which comprises a synthetic polycrystalline diamond face 36 secured to a tungsten carbide backing plate 38. A drill blank successfully used in accordance with the present invention is a drill blank manufactured by General Electric Corporation having a synthetic STRATAPAX brand polycrystalline diamond face of 0.5 mm secured to a 2.5 mm thick tungsten carbide backing plate. In one application the drill blank had a circular cross-section with a 0.5 inch diameter, but it will be appreciated that other sizes of blanks and configurations other than circular may be utilized without departing from the spirit or scope of the present invention. Although not illustrated, the cutting face of the cutter assembly need not be planar, but rather may be curved, multifaceted, or the like. The strong and reliable cutter attachment achieved by the present invention enables the use of smaller drill blanks for use in drilling medium to relatively hard formations.

Referring back to FIGS. 2-4, the backing plate 38 of the drill blank is secured to the front face of a contoured support 44. In a preferred embodiment, the support is machined from tungsten carbide, while it will be appreciated that other materials, for example, molybdenum, may be utilized. Support 44 includes a curved back 46, a flat base 48, a top 52 and a flat front 54 to which the backing plate of the drill blank is secured. It will be appreciated that the curved back portion 46 subtends an arc in excess of 180°, preferably on the order of 240°, and that substantially the entire curved portion 46 is brazed to the mating wall of the pocket formed in the drill bit head.

Figure 4:
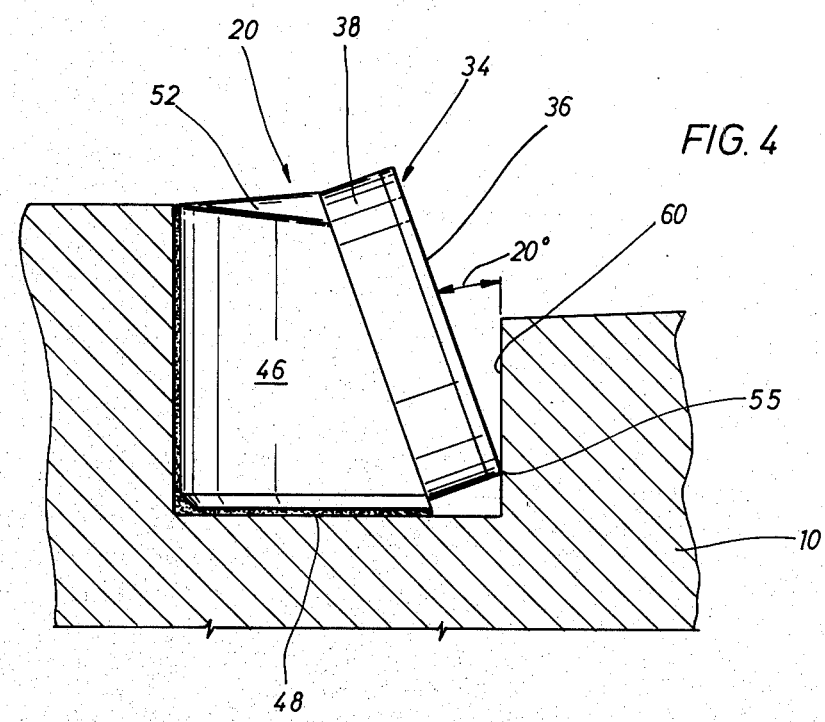
FIG. 4 is a side view of the cutter assembly and pocket illustrated in FIG. 3.
Figure 5:
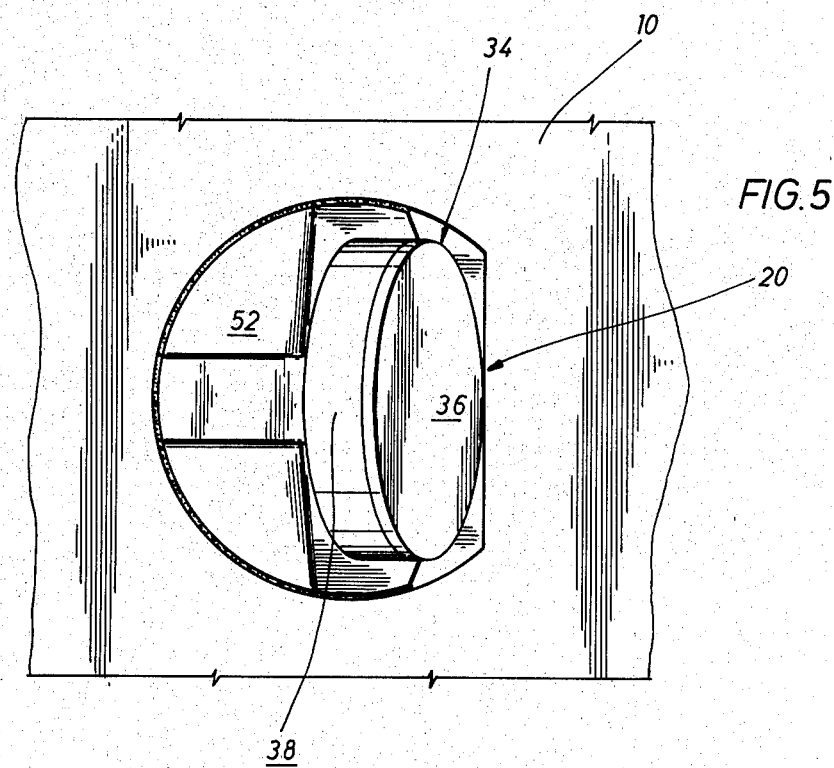
FIG. 5 is a top view of the cutter assembly and pocket illustrated in FIGS. 3 and 4.

FIGS. 4 and 5 illustrate cutter assembly 20 secured within the matrix of drill bit 10. Preferably, the entire base 48 and curved back 46 are in a close sliding relationship with the mating walls of the pocket so as to form the force-fit which securely locates and fixtures the cutter assembly within the pocket. As best shown in FIG. 4, the curved portion 46 subtends an arc in excess of 180° and is, therefore, capable of self-fixturing the cutter assembly 20 within the pocket without any appreciable force being exerted at point 55 between the drill blank 34 and the front face 60 of the pocket. Stated differently, substantially the entire force fit is achieved along the interface between curved portion 46 and the mating portion of the pocket while the depth to which the cutter assembly 30 is inserted into the pocket is controlled by having the bottom 48 abut the bottom of the pocket. It will be appreciated that, according to the preferred embodiment, prior to the force fitting of the cutter assembly into the pocket a predetermined amount of brazing material, preferably in the form of brazing foil, will be inserted into the pocket in contact with the base and curved wall portions of the pocket. Therefore, in the preferred manner of practicing the invention, the force fit is actually between the cutter assembly and the pocket with the relatively thin brazing foil in place. However, it will also be appreciated that the cutter assembly may be force fit directly into the pocket without the presence of brazing material in the pocket, for example, where braze wire or braze powder is placed over the pocket and allowed to melt during the brazing operation so that it flows into the pocket by capillary action.

It is critical that the face of the cutter assembly protrude above the leading portion of the drill bit by a carefully controlled distance. For example, in the embodiment illustrated in FIGS. 1-5, the face preferably extends above the drill bit 0.060 inch to a tolerance with an accuracy of at least ±0.001 inch. This tolerance is important for two reasons. First, uneven protrusion of the cutters will cause certain cutters to do a great deal more work than other cutters and thereby tend to cause failure of the excessively protruding cutters. Secondly, the protrusion of the cutter above the matrix affects the hydraulics of the bit.

Another critical aspect of securing the cutter assemblies in place is that the spacing along the blades of the drill bit must be carefully controlled, preferably to a tolerance with an accuracy on the order of ±0.001 inch. It has been found that the locating and fixturing of the cutter assemblies in accordance with the present invention permits remarkable accuracy in positioning of the cutter assemblies in terms of both protrusion above the matrix and spacing along the blade. Such accuracy has not been achieved by any known prior art technique.

It will be appreciated that in accordance with the present invention, when desired, it is a relatively simple matter to secure the cutter assembly so that the cutter face is disposed at a side rake rather than being disposed "straight on" as illustrated in FIG. 1.

In the embodiment illustrated in FIGS. 1-5, each pocket is formed with its sidewalls perpendicular to the tangent at that position on the bit face. Because of the curvature of the bit face, the pockets are not coplanar nor are they parallel. As mentioned previously, it is desirable that the planar cutter face of the cutter assembly be presented at a rake angle between 0° to −30°, with approximately −20° being preferred. Therefore, support front 54 is slanted approximately 20° to give the predetermined rake angle. It will be appreciated that the formation of the sidewalls of the pockets perpendicular to the tangent is not critical, but does facilitate the making of the mold. The pocket sidewalls may be at any suitable angle; what is critical is that the rake angle of the projecting portion of the cutter face be that angle which is predetermined by the drilling conditions to be encountered. As stated above, the cutter face need not be planar. In instances where the cutter face is not planar, e.g. curved or multifaceted, a "rake angle" will nevertheless be determined to define the angle at which the active portion of the cutter face engages the formation. Calculations for a rake angle for nonplanar cutter faces is somewhat more complicated than with planar faces, but there will always be some rake angle determined by the orientation of the cutter assembly within its pocket.

It will also be appreciated that according to the embodiment illustrated in FIGS. 1-5 the compressive force of the bit face on the formation caused by the weight of the drill string will tend to aid in urging the cutter assemblies into their pockets. During drilling operations, other force components will cause a resultant force which is not parallel to the axis of the bit, i.e., not vertical; however, the resulting force will still have a substantial vertical component that will tend to urge at least some of the cutter assemblies within the pockets.

In an illustrative operation, the 36 cutter assemblies (6 blades and 6 cutter assemblies per blade) will be subjected to a compressive load on the order of 40,000 pounds and, during operation, a torque of approximately 6,000 foot pounds may be loaded on the cutters.

A preferred method of manufacturing a drill bit as illustrated in FIG. 1 includes the following steps:

(a) forming a drill bit head with at least one dimensionally controlled pocket formed in the bit face, the pocket being free from internal negative relief and being formed to present the cutter face of an associated cutter assembly at a predetermined rake angle;

(b) providing a cutter assembly having a cutter face, the cutter assembly being adapted to being force fit into the pocket while maintaining a portion of the cutter face protruding above the drill bit head at the predetermined rake angle;

(c) placing a brazing material in communication with the pocket;

(d) locating the cutter assembly by force fitting a portion of the cutter assembly into the pocket; and (e) brazing the cutter assembly within the pocket by a furnace cycle having a maximum temperature below that which causes thermal damage to either the drill bit head or the cutter assembly.

According to the preferred method of practicing the invention, the brazing operation is carried out in accordance with standard brazing techniques developed by General Electric Company as described in a General Electric publication entitled "COMPAX® Diamond Drilling Update", COMPAX Product and Application Development, General Electric Company, April 1976, which is incorporated herein by reference. Briefly stated, the preferred brazing operation includes the following steps: (1) coating the pocket and the portion of the cutter assembly to be secured with a flux; (2) inserting a silver braze alloy foil, preferably AWS BAg-1 with a thickness on the order of 0.004 inch, into the pocket; and, (3) brazing in a single furnace cycle with rapid heating to a temperature in the range from 1250° to 1294° F. and holding the temperature for approximately ten minutes. The brazing is preferably performed in a reducing or inert atmosphere, e.g. a hydrogen atmosphere. With the use of General Electric STRATAPAX material the temperature is limited to 1294° F. so as not to damage the synthetic material. However, higher temperatures may be reached in the furnace cycle with natural or other synthetic materials that can withstand higher temperatures. The purpose of the flux is to clean the surfaces to be secured to facilitate brazing and to aid the flow of the brazing alloy. While the flux normally takes the form of a paste, it has been found that using only the liquor from the paste results in reduced gas production in the pocket. It will be understood that other brazing techniques may be utilized provided that the maximum temperature during the furnace cycle does not cause thermal damage to either the drill bit head or the cutter assembly.

While it has been found that the use of proper brazing techniques, especially the use of a proper flux, does not result in the generation of excessive gases, it is also known that certain brazing techniques will generate gases that will tend to gather within the pocket. Therefore, each pocket may be provided with a gas vent to allow undesirable gases formed during the brazing operation to escape.

ALTERNATIVE EMBODIMENTS

Figure 6:
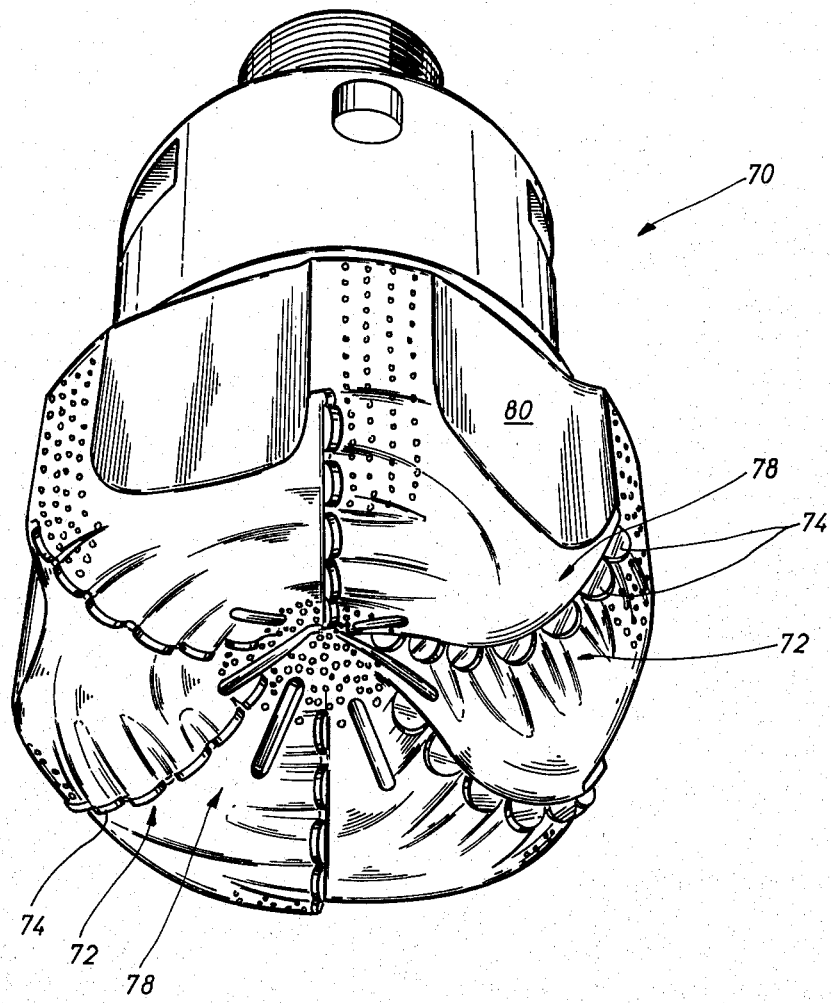
FIG. 6 is a perspective view of an alternative embodiment of a drag type drill bit constructed in accordance with the present invention.
Figure 7:
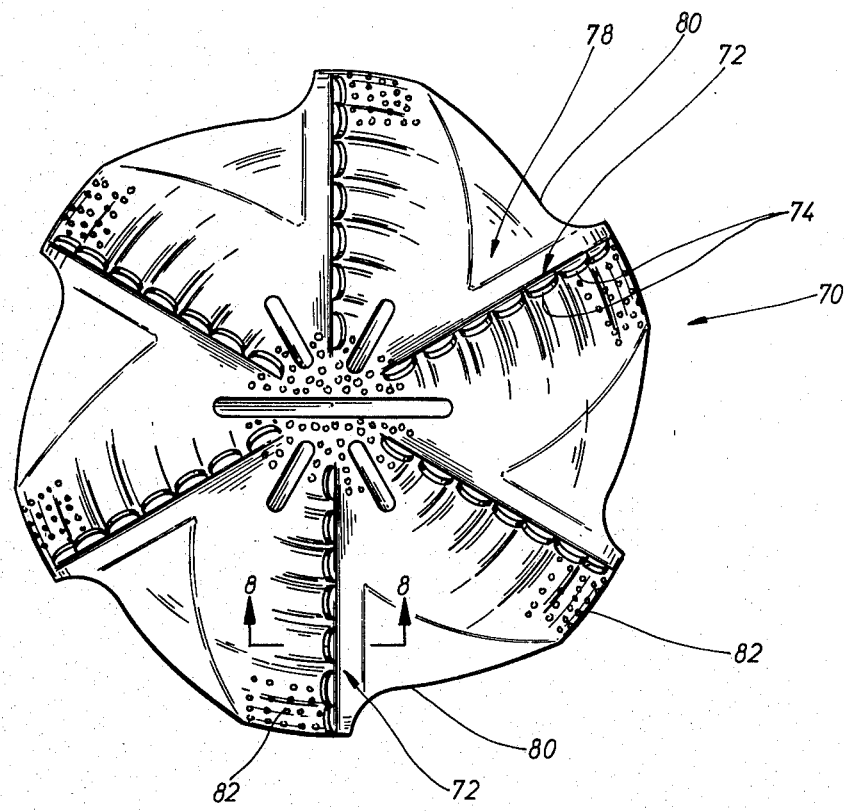
FIG. 7 is a bottom view of the drill bit illustrated in FIG. 6.

A first alternative embodiment of a drill bit constructed in accordance with the present invention will be described with reference to FIGS. 6-8. FIGS. 6 and 7 illustrate a six-way drag drill bit 70 with straight blades 72. Each straight blade includes either six or seven cutter assemblies 74 which extend radially along the face of the drill bit. The portion of the face of the drill bit ahead of each blade forms a waterway or fluid course 78 which is a path for the drilling mud to take as it emerges from the face of the drill bit and is channelled to the perimeter of the drill bit. At the perimeter each fluid course terminates in a recessed portion 80 that allows the mud and entrained cuttings to move back up the borehole in the manner known in the art. The area between adjacent recesses 80 includes recessed gauge diamonds 82 which are utilized to maintain the borehole diameter.

Figure 8:
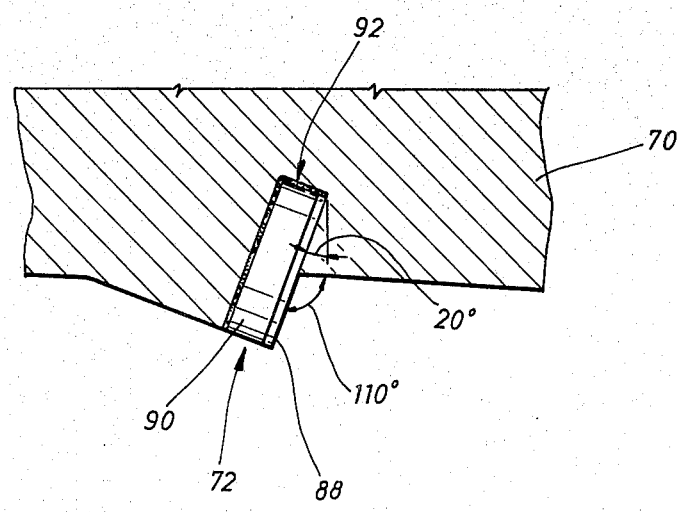
FIG. 8 is an enlarged, fragmented view of the cutter assembly utilized in the bit shown in FIGS. 6 and 7 as it is located within a pocket formed in the drill bit matrix.

FIG. 8 illustrates a cutter assembly 72 which is located and fixtured by brazing into a pocket formed in the drill bit matrix. According to this alternative embodiment, the cutter assembly 72 consists of a drill blank comprising a synthetic polycrystalline diamond face 88 which is secured to a backing plate 90. In a particular embodiment, the drill blank is a STRATAPAX brand drill blank having a diameter of 0.5 inch, a diamond layer thickness of 0.5 mm and a tungsten carbide backing plate thickness of 2.5 mm. Cutter assembly 72 is force-fit into its pocket 92 so that the back surface of the backing plate 90 is in close relationship with the mating portion of the pocket. The lower marginal portion of front face 88 is likewise in contact with the front wall portion of the pocket. Therefore, the force-fit is effected by a sliding fit of the cutter assembly 72 between the back and front walls of the pocket. The lowermost base portion of cutter assembly 72 is located in contact with the curved base of the pocket. It will be understood, of course, that according to the preferred method of practicing the invention a brazing foil is placed along the front and rear portions of the pocket before inserting the cutter assembly. Unlike the embodiment described in FIGS. 1-5, a significant portion of the cutter face is in contact with the front wall of the pocket. It can be seen that a close sliding relationship between the surfaces is necessary to achieve a force fit.

In both of the illustrated embodiments, the cutter faces are preferably disposed at a negative rake angle on the order of 20°. It has been found that negative rake angles from 0° to −30°, and particularly negative rake angles in the range of from −15° to −30°, provide the best results with the use of synthetic polycrystalline diamond cutters on drag drill bits. In the embodiment illustrated in FIGS. 6-8 the cutter assemblies are located at the −20° rake angle by forming the pocket sidewalls 110° from the tangent at that point on the bit face.

During operation, the braze lines, i.e., the interface between brazed members, tend to be placed in shear. In the alternative embodiment illustrated in FIGS. 6-8, the primary braze line is between the rear of backing plate 90 and its associated pocket wall. It has been found that by introducing a support, e.g. support 44, between the drill blank and the braze line, the effects of bending and shear at the braze line are minimized. Therefore, the embodiment illustrated in FIGS. 1-5 has the advantage of minimizing the effects of shear.

Figure 9:
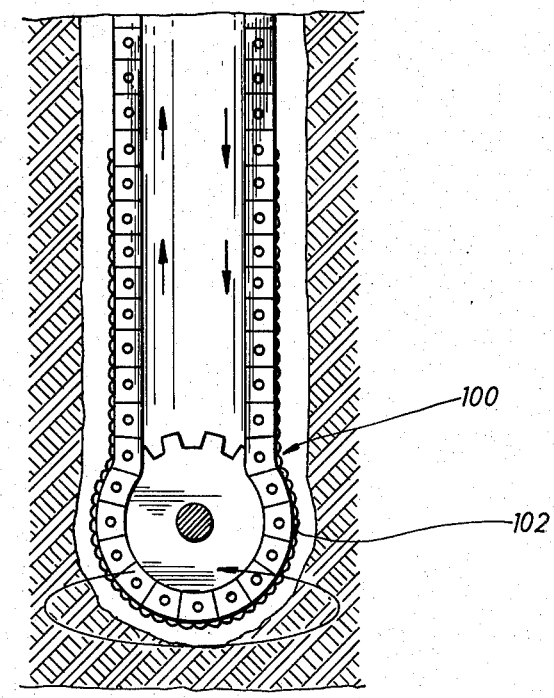
FIG. 9 is a side view of a continuous chain bit wherein the cutter assemblies are formed in the chain links in accordance with the present invention.

FIG. 9 illustrates a second alternative embodiment wherein the present invention is utilized in association with a continuous chain bit 100 of the type generally described at page 58 of the December 1977 issue of DRILLING magazine. According to the illustrated embodiment, the continuous chain bit 100 comprises a chain 102 which circulates between two sprockets, one on the bottom of the bit and the other several feet distant at the top of the bit. The chain includes a plurality of cutting surfaces, e.g. seven cutting surfaces, so that the chain may be periodically advanced to bring a new surface into position without having to remove the drill bit from the hole. According to this alternative embodiment, a plurality of cutter assemblies are provided on the face of each cutting surface of the chain in accordance with the pocket brazing technique of the instant invention. It has been found that cutter assemblies substantially identical to cutter assemblies 72 illustrated in FIGS. 6-8 may be secured within mating pockets formed in the continuous chain to provide excellent cutting characteristics.

While the present invention has been disclosed in connection with several illustrated embodiments, it will be apparent to those skilled in the art that numerous modifications may be made without departing from the spirit or scope in the instant invention. For example, the angle at which the pockets are formed may be any desired angle since the force fitting of the cutter assembly into the pocket serves to self fixture the cutter assembly prior to brazing. Although the invention is particularly well suited to use with drag type drill bits and continuous chain drill bits, it will be appreciated that the invention is applicable to other situations where cutter assemblies are attached to tools. These and other variations are within the spirit and scope of the present invention.

I claim:

1. A method of manufacturing a drill bit for use in association with a rotary drill stem, said bit comprising a bit head having a plurality of dimensionally controlled pockets and a plurality of cutter assemblies secured within said pockets which cutter assemblies comprise cutter face material that suffers thermal damage above a thermal degradation temperature; said method comprising the steps of:
   forming a drill bit head by powder metallurgy at a temperature above the cutter face material thermal degradation temperature, with said plurality of dimensionally controlled pockets each having sidewalls and being free from internal negative relief and formed to present the cutter face of each said cutter assemblies at a predetermined rake angle;
   forming said cutter assemblies, each comprising a drill blank having a cutter face and a support secured to said drill blank, wherein said support is of a material and has dimensions such that said support forms a frictional relationship with the sidewalls of a pocket without deforming said bit head when said support is force fit into said pocket and subsequently heated to a brazing temperature below the degradation temperature of said cutter face;
   placing a brazing material in communication with each of said pockets;
   force fitting said cutter assembly supports into said dimensionally controlled pockets; and
   brazing said cutter assembly supports within said pockets by a furnace cycle having a maximum temperature below said cutter face thermal degradation temperature.

2. A method as claimed in claim 1 including the step of forming the pocket with a gas vent.

3. A method as claimed in claim 1 wherein the brazing material is brazing foil.

4. A method as claimed in claim 1 wherein the cutter face comprises a synthetic polycrystalline diamond.

5. A method as claimed in claim 1 wherein the step of forming the drill bit head by powder metallurgy includes the step of utilizing a graphite mold having a protuberance for forming the pocket, the protuberance having external dimensions slightly in excess of the inner dimensions of the finished pocket to allow for shrinkage during the furnacing of the drill bit head.

6. A method as claimed in claim 1 wherein the cutter face is planar and the predetermined rake angle is between 0° and −30°.

7. A method as claimed in claim 1 wherein the cutter face is planar and the predetermined rake angle is on the other of −20°.

8. A method as claimed in claim 1 wherein multiple blades are formed on the drill bit head, each blade including a plurality of pockets and associated cutter assemblies.

9. A method as claimed in claim 1 wherein the height of the cutter face above the bit head is controlled to a tolerance with an accuracy of at least ±0.001 inch.

10. A drill bit manufactured by the method of claim 1.

11. A drill bit comprising:
   A drill bit head formed by powder metallurgy and having a plurality of dimensionally controlled pockets formed therein, which pockets have sidewalls free from internal negative relief; and
   a plurality of cutter assemblies, one for each of said pockets, each comprising a drill blank having a cutter face, and a support secured to said drill blank and secured to said pocket by brazing, wherein each support is of a material and has dimensions such that said support forms a frictional relationship with the sidewalls of a pocket without deforming said bit head when said support is force fit into said pocket and subsequently said cutter assemblies and said bit head are heated to a brazing temperature below the degradation temperature of said cutter face.

12. A drill bit as claimed in claim 11 including a gas vent in at least some of said pockets.

13. A drill bit as claimed in claim 11 wherein said cutter assemblies each comprise a drill blank having a synthetic poly crystalling diamond face and a backing plate secured to said face and to said support.

14. A drill bit as claimed in claim 13 wherein each said support comprises a planar surface for securing said backing plate and comprises a curved portion subtending an arc of greater than 180°, wherein said curved portion is truncated at one side to form said planar surface; and each pocket of said bit head having a sidewall shaped to receive said support curved portion in a manner inducing a frictional relationship between said sidewall and said support for holding said cutter assemblies in a predetermined attitude within said pockets during a furnace brazing cycle.

15. A drill bit as claimed in claim 14 wherein the drill bit head is formed of tungsten carbide by powder metallurgy, wherein said support is formed of a material selected from the group consisting of tungsten carbide or molybdenum, and wherein said backing plate is formed of tungsten carbide.

16. A drill bit as claimed in claim 15 including a shank having a bore, wherein said bit head is affixed to said shank and wherein said bit head comprises a crown portion including a plurality of blades forming fluid courses, and wherein said pockets are located in said blades.

17. A drill bit as claimed in claim 11 wherein said cutter face extends outwardly within a tolerance range with an accuracy of at least ±0.001 inch.

18. A drill bit comprising:
    a drill bit head having a plurality of cutter-locating pockets, said head and pockets being formed by powder metallurgy from a carbide containing matrix formed within a graphite mold having protuberances sizes slightly in excess of said pockets to allow for shrinkage during furnacing of said drill bit head;
    a cutter assembly for each of said pockets, secured to said pocket by placing a brazing material between said pocket surfaces and said cutter assembly and holding said cutter assembly in said pocket during a single cycle brazing operation by force fitting said cutter assembly in a manner inducing a frictional relationship between said pocket and said cutter assembly without deforming said drill bit head.

19. A method of securing a cutter assembly in a dimensionally-controlled pocket of a drill bit head, comprising the steps of:
    placing a brazing material in communication with said dimensionally-controlled pocket, said pocket being free from any internal negative relief;
    holding said cutter assembly in said dimensionally-controlled pocket by force fitting said assembly in a manner including a frictional relationship between said dimensionally controlled and said assembly without deforming said drill bit head;
    placing said drill bit head with said cutter assembly and associated brazing material in a furnace and brazing said cutter assembly within said pocket by a single furnace cycle having a maximum temperature below that which causes thermal damage to either the drill bit head or any portion of the cutter assembly.

* * * * *